(12) United States Patent
Matsui et al.

(10) Patent No.: US 6,814,944 B1
(45) Date of Patent: Nov. 9, 2004

(54) MODIFYING DEVICE

(75) Inventors: Nobuki Matsui, Osaka (JP); Shuji Ikegami, Osaka (JP); Yasunori Okamoto, Osaka (JP); Kazuo Yonemoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 459 days.

(21) Appl. No.: 09/914,378

(22) PCT Filed: Nov. 8, 2000

(86) PCT No.: PCT/JP00/07867

§ 371 (c)(1),
(2), (4) Date: Aug. 28, 2001

(87) PCT Pub. No.: WO01/47801

PCT Pub. Date: Jul. 5, 2001

(30) Foreign Application Priority Data

Dec. 28, 1999 (JP) ............................................ 11-372696

(51) Int. Cl.⁷ .............................. B01J 10/00; B01J 8/04
(52) U.S. Cl. ......................... 422/192; 422/198; 422/218
(58) Field of Search ................................ 48/128, 127 A, 48/198.1, 198.3, 198.7; 422/188–194, 198, 203, 211, 218, 234, 235

(56) References Cited

U.S. PATENT DOCUMENTS

| | | | | |
|---|---|---|---|---|
| 4,810,472 A | * | 3/1989 | Andrew et al. | 422/197 |
| 4,909,808 A | * | 3/1990 | Voecks | 48/94 |
| 5,030,440 A | * | 7/1991 | Lywood et al. | 423/655 |
| 5,071,627 A | * | 12/1991 | Child et al. | 422/196 |
| 5,458,857 A | * | 10/1995 | Collins et al. | 422/198 |
| 6,096,106 A | * | 8/2000 | Ruhl et al. | 48/197 R |
| 6,409,974 B1 | * | 6/2002 | Towler et al. | 422/172 |

FOREIGN PATENT DOCUMENTS

| | | |
|---|---|---|
| EP | 600621 | 6/1994 |
| EP | 773064 | 5/1995 |
| EP | 922666 | 6/1999 |
| JP | 60-181588 | 9/1985 |
| JP | 5-109422 | 4/1993 |
| JP | 5-237394 | 9/1993 |
| JP | 8-231201 | 9/1996 |
| JP | 10-106606 | 4/1998 |
| JP | 11-106204 | 4/1999 |
| WO | WO-9808771 A2 * | 3/1998 |

* cited by examiner

*Primary Examiner*—Kiley Stoner
*Assistant Examiner*—Kevin McHenry
(74) *Attorney, Agent, or Firm*—Nixon Peabody, LLP; Donald R. Studebaker

(57) ABSTRACT

Shift conversion of hydrogen-rich reformed gas produced by reaction including partial oxidation of feed gas in a reforming reaction section (6) is made by its water gas shift reaction with shift conversion catalyst in a shift reaction section (10) in order to reduce CO contained in the reformed gas and enhance the yield of hydrogen. In this case, for the purpose of enabling high-temperature reformed gas from the reforming reaction section (6) to undergo the shift conversion as it is and thereby simplifying the construction of a shift conversion unit, the reformed gas from the reforming reaction section (6) is introduced directly into a reformed gas passage (11) of the shift reaction section (10) and thereby undergoes the shift reaction while heat-exchanging with the feed gas.

7 Claims, 9 Drawing Sheets

MODIFYING DEVICE

TECHNICAL FIELD

This invention relates to a shift conversion unit for causing reformed gas, which has been produced by reforming hydrocarbon-based feed gas by partial oxidation reaction, to undergo shift conversion by water gas shift reaction with catalyst.

BACKGROUND ART

In general, hydrogen can be produced by reforming hydrocarbon or methanol. Fuel reforming units for producing hydrogen through such reforming can be used for fuel cells, hydrogen engines or the like.

As a reforming unit of such kind, there is conventionally known one which is incorporated into a fuel cell system as disclosed in Japanese Unexamined Patent Publication No. 11-67256. This fuel reforming unit includes a fuel reformer loaded with catalyst which exhibits activity to partial oxidation reaction, and is designed to introduce feed gas into the fuel reformer to produce reformed gas with hydrogen by partial oxidation reaction of the feed gas.

Further, in order to reduce CO (carbon monoxide) in the reformed gas produced in the above manner and improve the yield of hydrogen, the reformed gas is generally caused to undergo shift conversion by subjecting it to water gas shift reaction with shift conversion catalyst in a shift reaction section of a shift conversion unit.

Specifically, in the water gas shift reaction, carbon monoxide is oxidized by water to convert into carbon dioxide and hydrogen as expressed in the following chemical formula.

$$CO+H_2O \rightarrow CO_2+H_2$$

Meanwhile, for the shift conversion unit of this kind, its shift reaction section has poor heat resistance and therefore cannot receive the reformed gas as supplied at high temperature (for example, 700° C.) from its reforming reaction section and cause such high-temperature reformed gas to undergo reaction. Accordingly, the unit is designed to divide the shift reaction section into high-temperature and low-temperature shift reaction sections, first introduce the reformed gas from the reforming reaction section into the high-temperature shift reaction section after decreasing its temperature down to for example 400° C. and then introduce the reformed gas having exited from the high-temperature shift reaction section into the low-temperature shift reaction section after further decreasing its temperature down to for example 200° C.

In this case, however, there is the need for controlling respective inlet temperatures of the reformed gas flowing into the high-temperature and low-temperature shift reaction sections. This creates the problem of complicating the component layout for satisfying the need.

Further, under the temperature conditions where the reaction speed is high as in the above case, the reaction cannot be realized. Therefore, the above unit cannot avoid that the temperature range within which the reformed gas can undergo shift conversion is limited narrowly.

Furthermore, in the water gas shift reaction under the high temperature conditions, it is necessary to increase the amount of catalyst in order to ensure the heat resistance of the catalyst. This correspondingly increases the thermal capacity of the shift reaction section thereby causing the problem of deteriorating its response to load variations and start-up characteristics.

The present invention has been made in view of these problems and therefore an object thereof is to enable the high-temperature reformed gas from the reforming reaction section to undergo shift reaction in the shift reaction section just as it stands by contriving the construction of the shift conversion unit and to thereby simplify the construction of the shift conversion unit.

DISCLOSURE OF INVENTION

To attain the above object, in the present invention, the shift reaction section of the shift conversion unit subjects the reformed gas from the reforming reaction section to shift reaction while heat-exchanging it with feed gas or heat recovery gas toward the reforming reaction section.

More specifically, the present invention is directed to a shift conversion unit having a shift reaction section (10) for causing hydrogen-rich reformed gas produced by reaction including partial oxidation of feed gas in a reforming reaction section (6) to undergo shift conversion by water gas shift reaction with shift conversion catalyst. In this shift conversion unit, the shift reaction section (10) is arranged to introduce the reformed gas from the reforming reaction section (6) directly into a reformed gas passage (11) and effect the shift reaction while heat-exchanging the reformed gas with the feed gas.

Thus, the high-temperature reformed gas from the reforming reaction section (6) is introduced directly into the shift reaction section (10) and in the shift reaction section (10), the reformed gas is then caused to undergo shift conversion by water gas shift reaction while undergoing heat exchange with the feed gas in the feed gas passage (3) which should be supplied to the reforming reaction section (6). Accordingly, the reformed gas having exited from the reforming reaction section (6) will undergo shift conversion while keeping its high temperature. Therefore, the reformed gas can undergo shift conversion over a wide temperature range from high temperature conditions where the reaction speed is high to low temperature conditions where the reaction speed is low but the gas reacts advantageously at equilibrium.

Further, the need to control the temperature of the reformed gas can be eliminated, thereby simplifying the construction of the shift conversion unit.

Furthermore, the loading amount of the shift conversion catalyst into the shift reaction section (10) can be decreased and the thermal capacity can be reduced correspondingly. As a result, the shift reaction section (10) can maintain excellent response to load variations and start-up characteristics.

The shift conversion catalyst of the shift reaction section (10) is preferably noble metal catalyst with heat resistance or catalyst in which Pt, Pt alloy or Ru alloy is used as active metal. This provides desirable shift conversion catalyst for effecting shift reaction at the high temperature. In other words, if the noble metal catalyst with heat resistance is used, the catalyst can exhibit excellent endurance and hold high activity over a wide temperature range. Alternatively, if the catalyst in which Pt, Pt alloy or Ru alloy is used as active metal is employed, the catalyst can exhibit high activity at high temperatures and makes it difficult to cause methanation.

The shift conversion catalyst of the shift reaction section (10) can be applied to or supported on porous material. Since the porous material has a large surface area, the use of this material can increase the contact area between the shift conversion catalyst and the reformed gas in the shift reaction section (10) to increase the reaction rate and improve the efficiency of heat radiation.

The porous material is preferably of either foam metal, cordierite or ceramics. In this case, there can be obtained desirable porous material especially for ensuring the increase in the contact area of the catalyst with the reformed gas.

In the vicinity of the shift reaction section (10), a feed gas passage (3) can be provided for supplying the feed gas to the reforming reaction section (6). With this arrangement, the feed gas in the feed gas passage (3) located in the vicinity of the shift reaction section (6) is heated by heat of reaction in the shift reaction section (10). Accordingly, the heat of reaction in the shift reaction section (10) can be recovered for the preheating of the feed gas and this self-recovery of heat can improve the thermal efficiency of the shift conversion unit.

In the above case, the shift reaction section (10) and the feed gas passage (3) can be integrally formed in a housing (1). With this arrangement, the construction of the shift conversion unit can be simplified, thereby providing cost reduction.

A heat exchanger (15) may be provided for exchanging heat of reaction and sensible heat in the shift reaction section (10) with heat of the feed gas in the feed gas passage (3) by heat radiation. In this manner, the rate of heat exchange can be increased between the shift reaction section (10) and the feed gas thereby improving the efficiency of heat transfer.

The reformed gas passage (11) of the shift reaction section (10) is preferably formed so that the reformed gas flows from the center side toward the outer peripheral side of the shift reaction section (10). With this arrangement, such a temperature profile in the shift reaction section (10) can be formed that the temperature differs from entrance to exit thereof.

In the above case, the distance of portion of the shift reaction section (10) located downstream in a direction of flow of the reformed gas to the feed gas passage (3) is preferably larger than that of portion of the shift reaction section (10) located upstream in the direction of flow of the reformed gas to the feed gas passage (3). With this arrangement, the rate of heat exchange of the shift reaction section (10) with the feed gas passage (3) by heat radiation varies between the sides of the shift reaction section (10) upstream and downstream in the flow direction of the reformed gas. Accordingly, the temperature at the exit of the shift reaction section (10) can be held substantially uniformly.

The heat exchanger (15) can include a heat transfer fin (16) presented to the feed gas passage (3). In this case, the efficient of heat transfer can be further improved.

It is preferable that a plurality of said heat transfer fins (16) are provided along the feed gas passage (3) and the pitch of some of the heat transfer fins (16) located upstream in the direction of flow of the reformed gas in the shift reaction section (10) is smaller than that of some of the heat transfer fins (16) located downstream in the direction of flow of the reformed gas. With this arrangement, heat exchange between the shift reaction section (10) and the feed gas can be made smoothly.

A heat exchanger (23) may be provided which includes a reformed gas side heat transfer fin (21) presented to the reformed gas passage (11) and a feed gas side heat transfer fin (22) presented to the feed gas passage (3) and exchanges heat of reaction and sensible heat in the shift reaction section (10) with heat of the feed gas in the feed gas passage (3). Further, the shift conversion catalyst of the shift reaction section (10) is applied to or supported on at least the reformed gas side heat transfer fin (21). With this arrangement, the reformed gas in the reformed gas passage (11) of the shift reaction section (10) undergoes the shift reaction through the contact with the shift conversion catalyst on the reformed gas side heat transfer fin (21) presented to the reformed gas passage (11). The resultant heat of reaction is transferred from the reformed gas side heat transfer fin (21) to the feed gas in the feed gas passage (3) through the feed gas side heat transfer fin (22). Also in this case, the efficiency of heat transfer from the shift reaction section (10) to the feed gas can be improved.

The reforming reaction section (6), the feed gas passage (3) and the shift reaction section (10) may be integrally provided in a housing (1). In this manner, the construction of the shift conversion unit can be further simplified, resulting in cost reduction.

Alternatively, in a shift conversion unit of the present invention which has a shift reaction section (10) for causing hydrogen-rich reformed gas produced by reaction including partial oxidation of feed gas in a reforming reaction section (6) to undergo shift conversion by water gas shift reaction with shift conversion catalyst, the shift reaction section (10) is arranged to effect the shift reaction while heat-exchanging the reformed gas from the reforming reaction section (6) with heat recovery gas.

With this arrangement, the high-temperature reformed gas from the reforming reaction section (6) is caused in the shift reaction section (10) to undergo shift conversion by water gas shift reaction while undergoing heat exchange with the heat recovery gas. Accordingly, the reformed gas having exited from the reforming reaction section (6) will undergo shift conversion while keeping its high temperature. Therefore, the reformed gas can undergo shift conversion over a wide temperature range from high temperature conditions where the reaction rate is high to low temperature conditions where the reaction rate is low but the gas reacts advantageously at equilibrium.

Specifically, through the heat exchange between the high-temperature reformed gas from the reforming reaction section (6) and the heat recovery gas, the reformed gas entrance side of the shift reaction section (10) is elevated in temperature to increase the reaction rate while the reformed gas exit side thereof is lowered in temperature to reduce the reaction rate. As a result, the CO concentration can be reduced at thermal equilibrium.

Further, the need to control the temperature of the reformed gas can be eliminated thereby simplifying the construction of the shift conversion unit.

Furthermore, since the heat exchange is made in the shift reaction section (10), high-temperature heat exhausted therefrom can be recovered as heat recovery gas.

In addition, the loading amount of the shift conversion catalyst into the shift reaction section (10) can be decreased and the thermal capacity can be reduced correspondingly. As a result, the shift reaction section (10) can maintain excellent response to load variations and start-up characteristics.

In this case, like the aforementioned case, the shift conversion catalyst of the shift reaction section (10) may be noble metal catalyst with heat resistance. Since the noble metal catalyst with heat resistance exhibits excellent endurance, it can hold high activity over a wide temperature range.

Further, the shift conversion catalyst of the shift reaction section (10) may be catalyst in which Pt, Pt alloy or Ru alloy is used as active metal. If this catalyst in which Pt, Pt alloy or Ru alloy is used as active metal is employed, the catalyst can exhibit high activity at high temperatures and makes it difficult to cause methanation.

The shift conversion catalyst of the shift reaction section (10) is applied to or supported on porous material. With this structure, the contact area between the shift conversion catalyst and the reformed gas in the shift reaction section (10) can be increased to increase the reaction rate and improve the efficiency of heat radiation.

The porous material is preferably of either foam metal, cordierite or ceramics. In this case, there can be easily obtained porous material that especially ensures to increase the contact area with the reformed gas.

The shift conversion catalyst of the shift reaction section (10) may be applied to or supported on a catalyst support of metal. Thus, there can be obtained a desirable catalyst support for cooling the catalyst presented to the reformed gas passage (11) through the heat exchange with the heat recovery gas.

A heat recovery gas passage (37) through which the heat recovery gas flows can be provided in the vicinity of the catalyst support. With this arrangement, since the catalyst support is surrounded by the heat recovery gas passage (37), the thermal efficiency can be improved.

The heat recovery gas can be air. If air is the recovery gas, stable heat exchange can be implemented even at partial loads in the case of recovery of high-temperature heat, thereby easily obtaining serviceable heat recovery gas.

Further, the heat recovery gas may be off-gas from an oxygen electrode (34) (air electrode) of a fuel cell (31). If the off-gas of the fuel cell (31) is used as the heat recovery gas in this manner, it is not necessary to newly prepare air as the heat recovery gas unlike the above case, and the existing off-gas of the fuel cell (31) can be utilized as it is. In addition, the need for any blower and its driving power for allowing the air to flow as the heat recovery gas can be eliminated.

BEST MODE FOR CARRYING OUT THE INVENTION

The best mode for carrying out the present invention will be described as embodiments.

(Embodiment 1)

Figure 1:
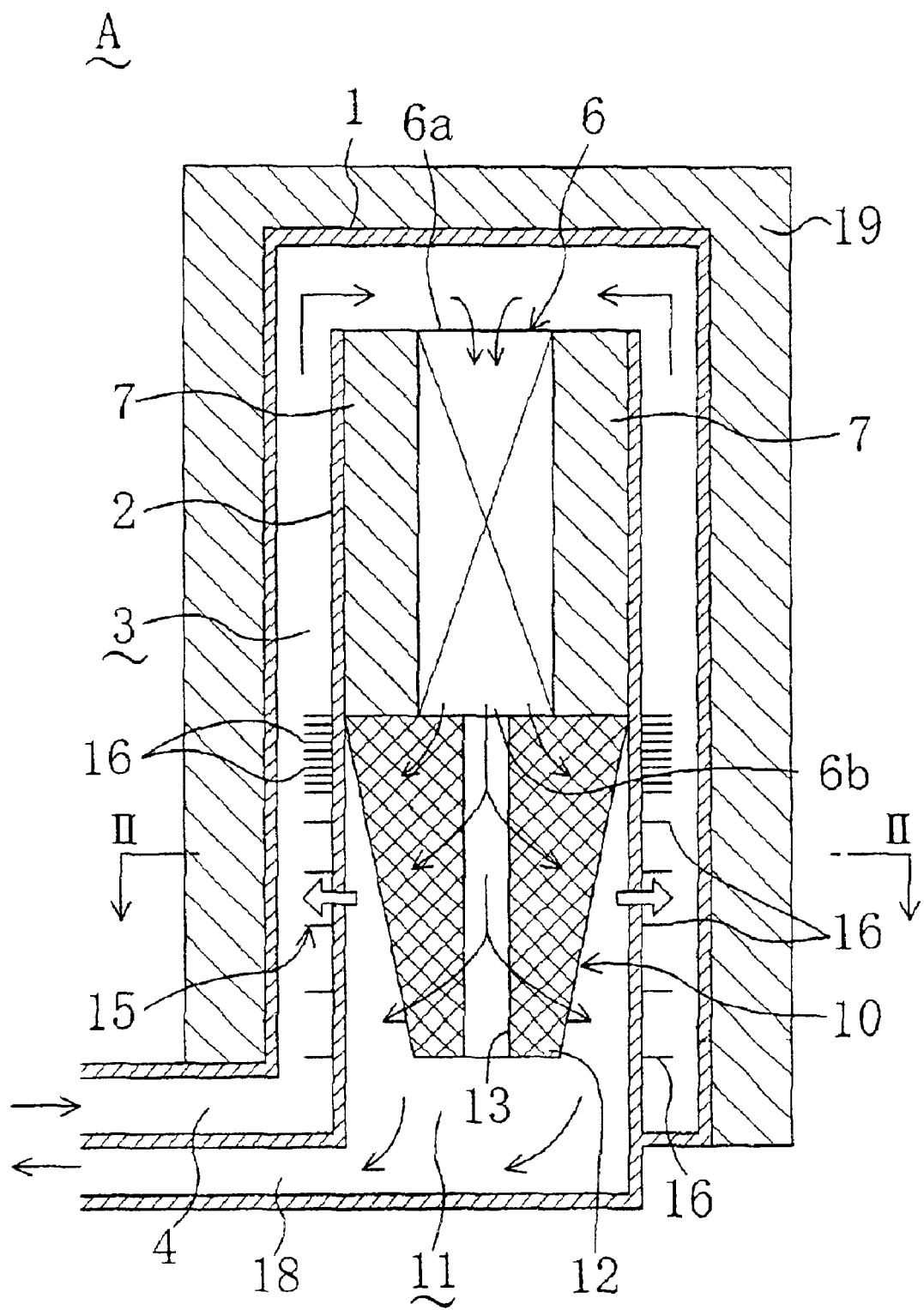
FIG. 1 is a cross-sectional view showing a shift conversion unit according to Embodiment 1 of the present invention.
Figure 2:
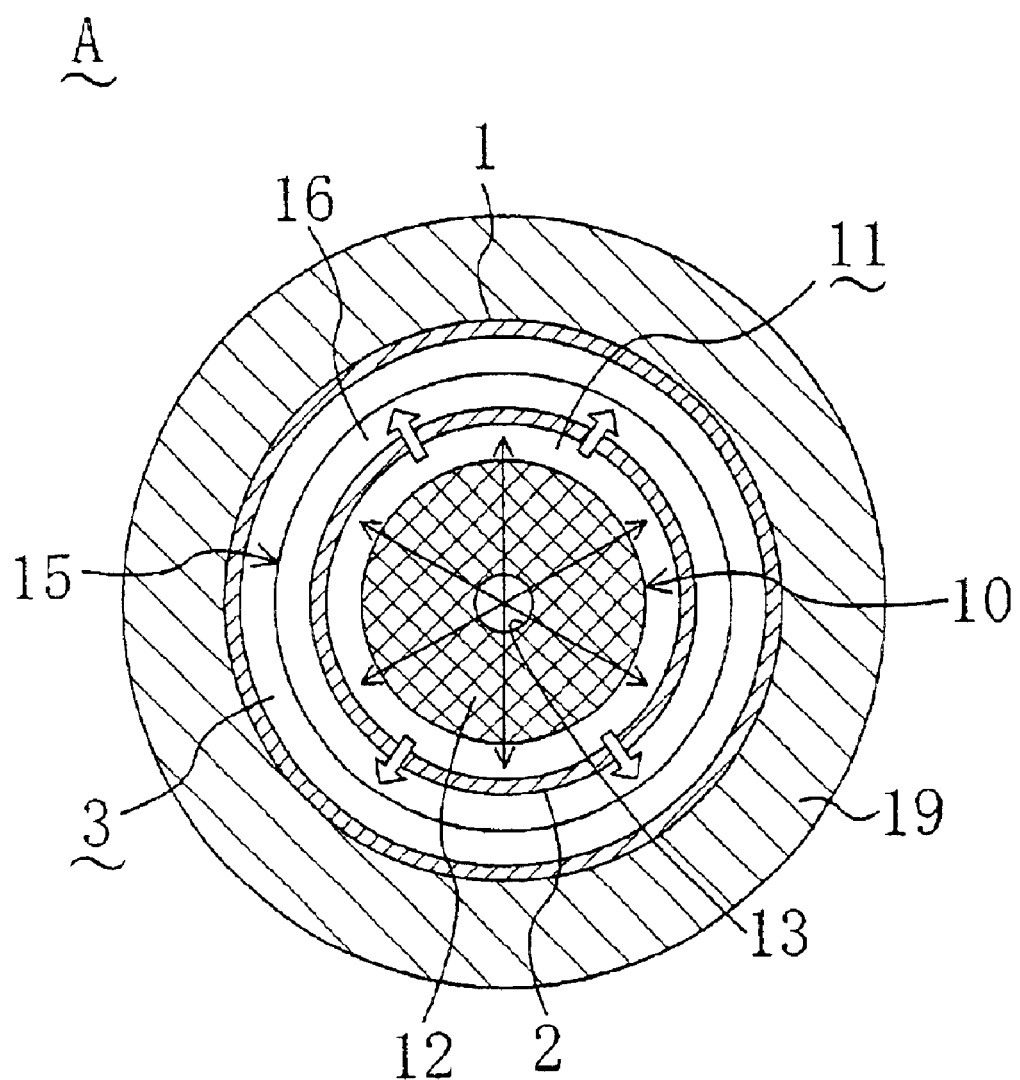
FIG. 2 is a cross-sectional view taken along the line II—II of FIG. 1.

FIGS. 1 and 2 show a shift conversion unit (A) according to Embodiment 1 of the present invention. This shift conversion unit (A) is used, in a fuel cell system (see FIG. 8), for causing gas reformed from feed gas containing city gas and moist air to undergo shift conversion by water gas shift reaction.

In FIGS. 1 and 2, (1) denotes a bottomed cylinder-shaped housing (1) for the shift conversion unit (A). Inside the housing (1), a cylindrical partition (2) is disposed to divide the internal space of the housing (1) into inner and outer subspaces, and formed integrally with the housing (1). One end of the partition (2) located on its housing (1) bottom side (upper side in FIG. 1) is partially cut away so that the inner and outer subspaces communicates with each other. The communicating part and the outer subspace itself constitute a feed gas passage (3). In the feed gas passage (3), one end of the outer subspace located on its housing (1) opening side (lower side in FIG. 1) provides a feed gas inlet (4). This feed gas inlet (4) is connected to a feed gas pipe located externally to the figure and arranged to supply the feed gas (containing city gas and moist air) fed past the feed gas pipe to the feed gas passage (3) between the housing (1) and the partition (2) therethrough.

At a housing (1) bottom side of the inner subspace inside the partition (2), a reforming reaction section (6) is provided for reforming the feed gas to produce hydrogen-rich reformed gas from the feed gas by reaction including partial oxidation. An inlet (6a) of the reforming reaction section (6) located on its housing (1) bottom side is communicated with the feed gas passage (3) at a position corresponding to the housing (1) bottom.

The reforming reaction section (6) is formed of a cylindrical monolith with a honeycomb structure which is made from ceramics, aluminium or the like and fitted into the partition (2), although it is not shown in detail. In this monolith, a large number of through holes passing through the monolith in an axial direction of the housing (1) (the vertical direction in FIG. 1) provide a gas passage. Further, catalyst of noble metal such as Pt, Rh or Ru is supported on the monolith. The feed gas is reformed into hydrogen-rich reformed gas by undergoing partial oxidation reaction with the catalyst while passing through the gas passage of the monolith.

In the inner subspace inside the partition (2), a fire-resistant thermal insulant (7) is disposed so as to be fitted in a gas-tight manner around the reforming reaction section (6). This thermal insulant (7) controls the rate of heat transfer between the reforming reaction section (6) and the feed gas passage (3).

Meanwhile, in a portion of the inner subspace inside the partition (2) located on its housing (1) opening side (lower side in FIG. 1), a shift reaction section (10) is provided for causing the reformed gas to undergo shift conversion by the water gas shift reaction with shift conversion catalyst in order to reduce the CO concentration in the reformed gas and increase the yield of hydrogen. In other words, the feed gas passage (3) for supplying the feed gas to the reforming reaction section (6) is disposed around the shift reaction section (10), and the shift reaction section (10) and the feed gas passage (3) are formed integrally together with the reforming reaction section (6) in the housing (1).

The shift reaction section (10) is arranged to introduce the reformed gas incoming from an outlet (6b) of the reforming reaction section (6) directly into a reformed gas passage (11) and cause the reformed gas to undergo shift reaction while exchanging heat with the feed gas. More specifically, the shift reaction section (10) has a catalyst support (12) of porous material formed by foam metal, cordierite or ceramics. Shift conversion catalyst for allowing shift reaction is applied to or supported on the catalyst support (12). The shift conversion catalyst is noble catalyst with heat resistance, and more particularly, catalyst in which Pt, Pt alloy or Ru alloy is used as active metal.

The catalyst support (12) has the shape of a frustum the outer diameter of which is diminished from the housing (1) bottom side to opening side, and is formed at the center thereof with a center hole (13) which passes through the catalyst support (12) in the axial direction of the housing (1) and forms part of the reformed gas passage (11). The center hole (13) is closed at a downstream end thereof on the side opposite to the reforming reaction section (6), so that major part of the reformed gas having been introduced into the shift reaction section (10) through the outlet (6b) of the reforming reaction section (6) flows through the center hole (13) of the catalyst support (12) and then flows radially outward through the catalyst support (12) into a space between the outer periphery of the catalyst support (12) and the partition (2), while the remaining part of the reformed gas flows directly into the catalyst support (12) at an upstream end surface thereof and then likewise flows radially outward into the space around the outer periphery of the catalyst support (12). The reformed gas passage (11) is formed along the above flows of the reformed gas.

Further, due to the frustum shape of the catalyst support (12) of the shift reaction section (10), the distance of portion of the outer periphery of the catalyst support (12) located downstream in a flow direction of the reformed gas (lower portion in FIG. 1) to the feed gas passage (3) is set larger than the distance of portion thereof located upstream in the flow direction (upper portion in FIG. 1) to the feed gas passage (3).

Furthermore, the outer periphery of the catalyst support (12) is located opposite the feed gas passage (3) around the partition (2). Accordingly, a heat exchanger (15) is provided for exchanging heat of reaction and sensible heat in the shift reaction section (10) with heat of the feed gas in the feed gas passage (3) by heat radiation (wherein heat flows during the heat exchange are shown in open arrows in the figure). This heat exchanger (15) has a plurality of heat transfer fins (16), (16), . . . extended at a portion of the outer periphery of the partition (2) which corresponds to the shift reaction section (10) so as to be presented to the feed gas passage (3). These heat transfer fins (16), (16), . . . are juxtaposed along the feed gas passage (3), and the pitch of some of the fins on the upstream side (upper side in FIG. 1) in the flow direction of the reformed gas in the shift reaction section (10) is set smaller than that of the other fins on the downstream side in the same direction.

One end of the shift reaction section (10) located on its housing (1) opening side provides a reformed gas outlet (18), and the reformed gas outlet (18) is connected to a fuel cell (see FIG. 8) located externally to the figure. Further, in FIGS. 1 and 2, (19) denotes a thermal insulant for covering the housing (1) for the purpose of thermal insulation.

According to this embodiment, during steady-state operation of the shift conversion unit (A), the feed gas (containing city gas and moist air) fed through the feed gas pipe is introduced into the housing (1) through the feed gas inlet (4) and then supplied to the feed gas passage (3) between the housing (1) and the partition (2). The feed gas in the feed gas passage (3) is preheated to a predetermined temperature by undergoing radiation of heat of reaction and sensible heat in the shift reaction section (10) through the heat exchanger (15). The feed gas preheated through the heat exchange with the reformed gas in this manner flows through the feed gas passage (3) toward the housing (1) bottom, during the time heat of reaction in the reforming reaction section (6) is transferred to the feed gas via the thermal insulant (7) and the partition (2), and the heat transfer further heats up the feed gas.

The feed gas having passed through the feed gas passage (3) flows into the reforming reaction section (6) through the inlet (6a) located on the housing (1) bottom side thereof, undergoes reaction including partial oxidation with the catalyst in the gas passage in the monolith of honeycomb structure and is thereby reformed into hydrogen-rich reformed gas. Further, the heat of reaction in the reforming reaction section (6) is transferred via the thermal insulant (7) and the partition (2) to the feed gas consecutively flowing through the feed gas passage (3).

The high-temperature reformed gas produced from the feed gas in the reforming reaction section (6) is introduced through the outlet (6b) of the reforming reaction section (6) into the shift reaction section (10) located inside the partition (2) and on the housing (1) opening side thereof, passes through the catalyst support (12), undergoes the water gas shift reaction with the shift conversion catalyst on the catalyst support (12) during its passage through the catalyst support (12), and is thereby converted into reformed gas with a reduced CO concentration and an enhanced hydrogen yield. Then, the reformed gas having exited from the shift reaction section (10) is let out through the reform gas outlet (18), and thereafter supplied to the fuel cell.

During the time, because of the heat exchanger (15) provided to exchange heat of reaction and sensible heat in the shift reaction section (10) with heat of the feed gas in the feed gas passage (3) by heat radiation, the reformed gas in the shift reaction section (10) undergoes shift conversion while lowering its temperature through the heat exchange with the feed gas in the feed gas passage (3). Accordingly, the high-temperature reformed gas having exited from the outlet (6b) of the reforming reaction section (6) will be introduced directly into the shift reaction section (10) while keeping its high temperature and undergo shift conversion. Therefore, the reformed gas can undergo shift conversion over a wide temperature range from high temperature conditions where the reaction rate is high to low temperature conditions where the reaction rate is low but the gas reacts advantageously at equilibrium.

Further, since the reformed gas from the reforming reaction section (6) is introduced directly into the shift reaction section (10) for shift conversion, this eliminates the need to control the temperature of the reformed gas from the reforming reaction section (6), thereby simplifying the construction of the shift conversion unit (A) and reducing the amount of the shift conversion catalyst in the shift reaction section (10). The resultant reduction in thermal capacity of the shift reaction section (10) provides retention of its excellent response to load variations and start-up characteristics.

Furthermore, since the shift conversion catalyst of the shift reaction section (10) has heat resistance because of the use of Pt, Pt alloy or Ru alloy as its active metal, it can satisfactorily effect the shift reaction at high temperatures. In addition, since the shift conversion catalyst is applied to or supported on the porous material of large surface area made of either foam metal, cordierite or ceramics, this increases the contact area between the shift conversion catalyst and the reformed gas in the shift reaction section (10), resulting in increased reaction rate and enhanced efficiency of heat radiation.

Further, the reformed gas introduced into the shift reaction section (10) through the outlet (6b) of the reforming reaction section (6) flows from the center to the outer periphery of the catalyst support (12). Specifically, major part of the reformed gas flows radially outward from the center hole (13) of the catalyst support (12) and then flows through the catalyst support (12) into the space between the outer periphery of the catalyst support (12) and the partition (2), while the remaining part of the reformed gas enters directly the catalyst support (12) at the upstream end surface thereof, likewise flows radially outward and then flows into the space around the outer periphery of the catalyst support (12). In this manner, such a temperature profile in the shift reaction section (10) can be formed that the temperature differs from entrance to exit thereof.

Furthermore, since the catalyst support (12) of the shift reaction section (10) is formed in the shape of a frustum so that the distance of portion of the outer periphery thereof located downstream in the flow direction of the reformed gas to the feed gas passage (3) is larger than that of portion of the outer periphery thereof located upstream in the flow direction, the rate of heat exchange of the shift reaction section (10) with the feed gas passage (3) by heat radiation varies between the sides thereof upstream and downstream in the flow direction of the reformed gas and therefore the temperature at the exit of the shift reaction section (10) can be held substantially uniformly.

Further, since the feed gas in the feed gas passage (3) around the shift reaction section (10) is heated by transfer of heat of reaction from the shift reaction section (10) through the heat exchanger (15) as described above, the heat of reaction in the shift reaction section (10) can be thus recovered for the purpose of preheating the feed gas and the self-recovery of heat can improve the thermal efficiency of the shift conversion unit (A). In addition, since the heat exchanger (15) has the heat transfer fins (16), (16), . . . presented to the feed gas passage (3), the rate of heat exchange between the shift reaction section (10) and the feed gas can be increased thereby enhancing the efficiency of heat transfer.

Furthermore, since the heat exchanger (15) has the plurality of heat transfer fins (16), (16), . . . provided along the feed gas passage (3) and the plurality of heat transfer fins (16), (16), . . . have different pitches between their upstream ones and downstream ones in the flow direction of the reformed gas, i.e., the pitch of the upstream ones is smaller than that of the downstream ones, heat exchange between the shift reaction section (10) and the feed gas in the feed gas passage (3) can be made smoothly.

Further, since the reforming reaction section (6), the feed gas passage (3) and the shift reaction section (10) are integrally formed in the housing (1), this simplifies the construction of the shift conversion unit (A) resulting in cost reduction.

(Embodiment 2)

Figure 3:
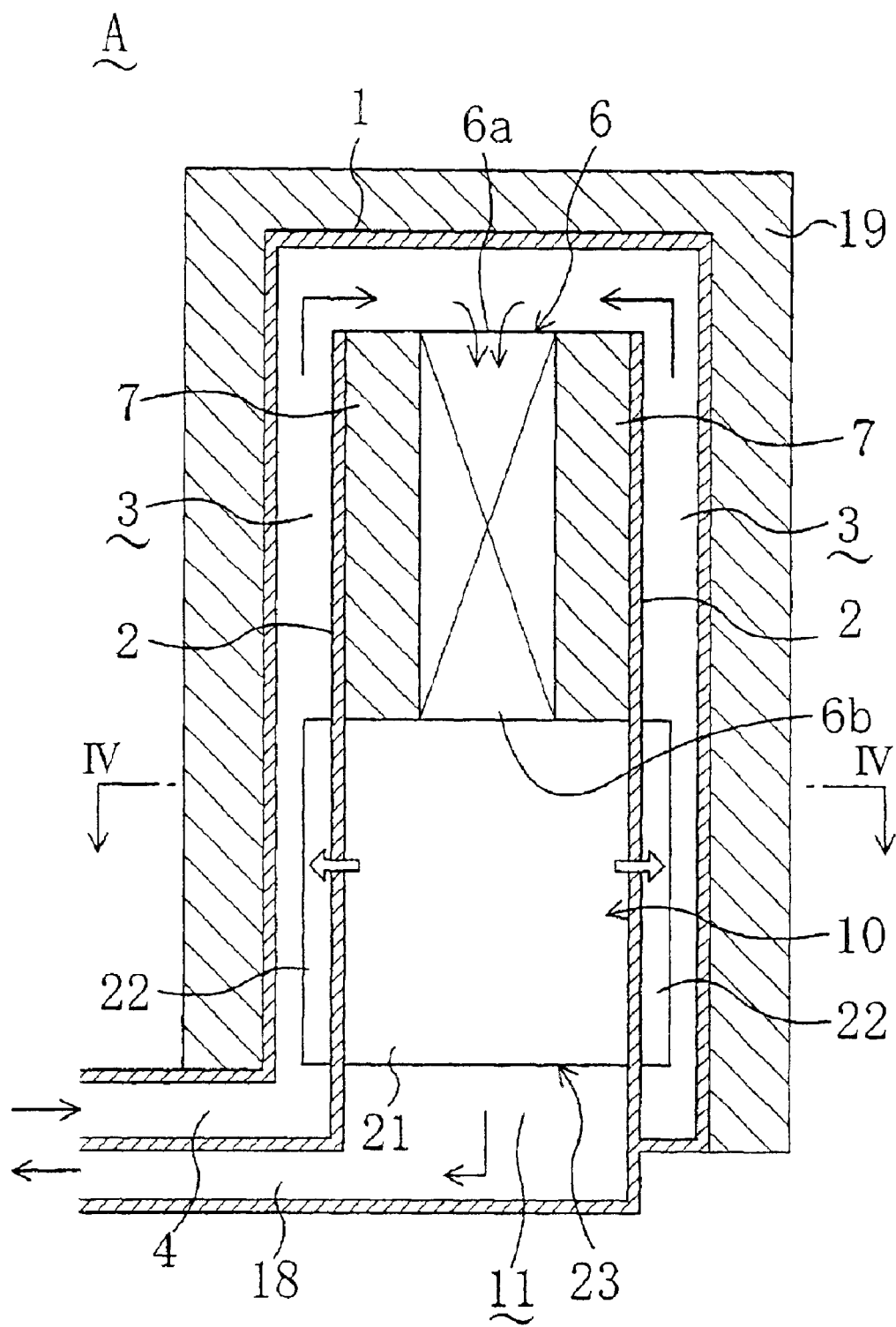
FIG. 3 is a corresponding view of FIG. 1 which shows Embodiment 2.
Figure 4:
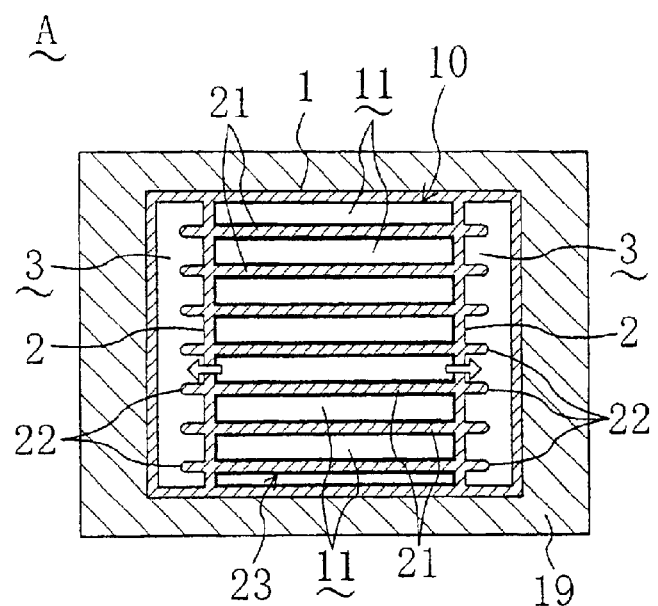
FIG. 4 is a cross-sectional view taken along the line IV—IV of FIG. 3.

FIGS. 3 and 4 show Embodiment 2 of the present invention (note that in each of embodiments hereinafter like parts as in FIGS. 1 and 2 are designated by like reference characters and the description thereof is omitted). This embodiment differs from Embodiment 1 in the structure of the shift reaction section (10).

Specifically, in this embodiment, a housing (1) of a shift conversion unit (A) has the shape of a bottomed rectangular tube, a pair of opposed partitions (2), (2) are disposed inside the housing (1) to divide the internal space thereof into one inner subspace and two outer subspaces, and both the partitions (2), (2) are formed integrally with the housing (1) (see FIG. 4). In each of the partitions (2), one end thereof located on its housing (1) bottom side (upper side in FIG. 3) is cut away so that the inner and outer subspaces communicates with each other, and the communicating part between the inner and outer subspaces and both the outer subspaces themselves constitute a feed gas passage (3).

Further, the shift reaction section (10) is provided with no catalyst support (12) as provided in Embodiment 1. Instead, between the inner surface portions of both the partitions (2), (2) corresponding to the shift reaction section (10), a plurality of reformed gas side heat transfer fins (21), (21), . . . are bridged to be integral with the partitions (2), (2) and to extend in a direction of the center line of the housing (1) so as to be presented to a reformed gas passage (11) (inner subspace) between both the partitions (2), (2).

On the other hand, from the outer surface of each of the partitions (2), a plurality of feed gas side heat transfer fins (22), (22), . . . are protruded to extend in the axial direction of the housing (1) so as to be presented to the feed gas passage (3). The reformed gas side heat transfer fins (21), (21), . . . and the feed gas side heat transfer fins (22), (22), . . . constitute a heat exchanger (23) for exchanging heat between the reformed gas in the reformed gas passage (11) and the feed gas in the feed gas passage (3).

Further, the reformed gas heat transfer fins (21), the partitions (2) and the housing (1) which are presented to the reformed gas passage (11) are each made from metal and constitute a catalyst support. Pieces of shift conversion catalyst forming the shift reaction section (10) are applied to or supported on the surface of each of the reformed gas side heat transfer fins (21) and the inner surface of each of the partitions (2) and the inner surface of the housing (1) (wherein positions of the pieces of shift conversion catalyst are indicated in heavy solid lines in FIG. 4). Other structures are the same as those of Embodiment 1. It is to be noted that the pieces of shift conversion catalyst need be applied to or supported on at least the surface of each of the reformed gas side heat transfer fins (21), (21), . . . .

Accordingly, in this embodiment, when the reformed gas having exited from an outlet (6b) of a reforming reaction section (6) is supplied to the reformed gas passage (11) of the shift reaction section (10), it undergoes shift reaction through the contact with the pieces of shift conversion catalyst on the surface of each of the reformed gas side heat transfer fins (21), the inner surface of each of the partitions (2) and the inner surface of the housing (1) during the time when it flows through the reformed gas passage (11). Then, the resultant heat of reaction is transferred from the reformed gas side heat transfer fins (21), (21), . . . through the feed gas side heat transfer fins (22), (22), . . . to the feed gas in the feed gas passage (3). Therefore, also in this case, the same effects as obtained in Embodiment 1 can be provided. Further, the efficiency of heat transfer from the shift reaction section (10) to the feed gas can be enhanced.

(Embodiment 3)

Figure 5:
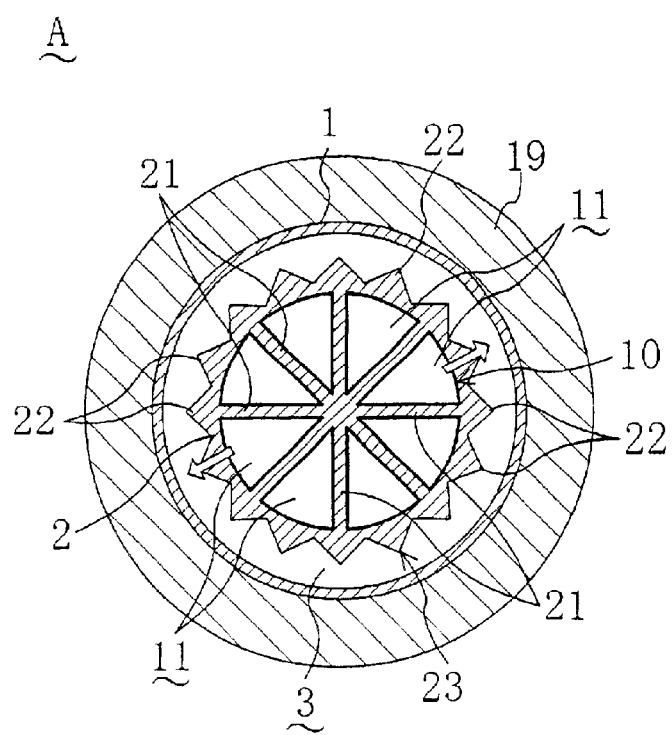
FIG. 5 is a corresponding view of FIG. 4 which shows Embodiment 3.

FIG. 5 shows Embodiment 3, wherein the construction of Embodiment 2 is changed in the shapes of the housing (1) and partition (2). Specifically, in this embodiment, a housing (1) and a partition (2) are each formed in cylindrical shape so as to be disposed concentrically, like Embodiment 1.

Further, feed gas side heat transfer fins (22), (22), . . . of a heat exchanger (23) are extended from the outer periphery of the partition (2), while reformed gas side heat transfer fins (21), (21), . . . are extended from the inner surface of the partition (2) to divide a reformed gas passage (11) into plural sections. Pieces of shift conversion catalyst are applied to or supported on the surface of each of the reformed gas side heat transfer fins (21) and the inner surface of the partition (2). Accordingly, also in this embodiment, the same effects as obtained in Embodiment 2 can be exhibited.

Although the feed gas passage (3), reforming reaction section (6) and shift reaction section (10) are integrally formed in the housing (1) in Embodiments 1 to 3, only the reforming reaction section (6) may be separated and the feed gas passage (3) and shift reaction section (10) may be integrally formed in the housing (1).

(Embodiment 4)

Figure 6:
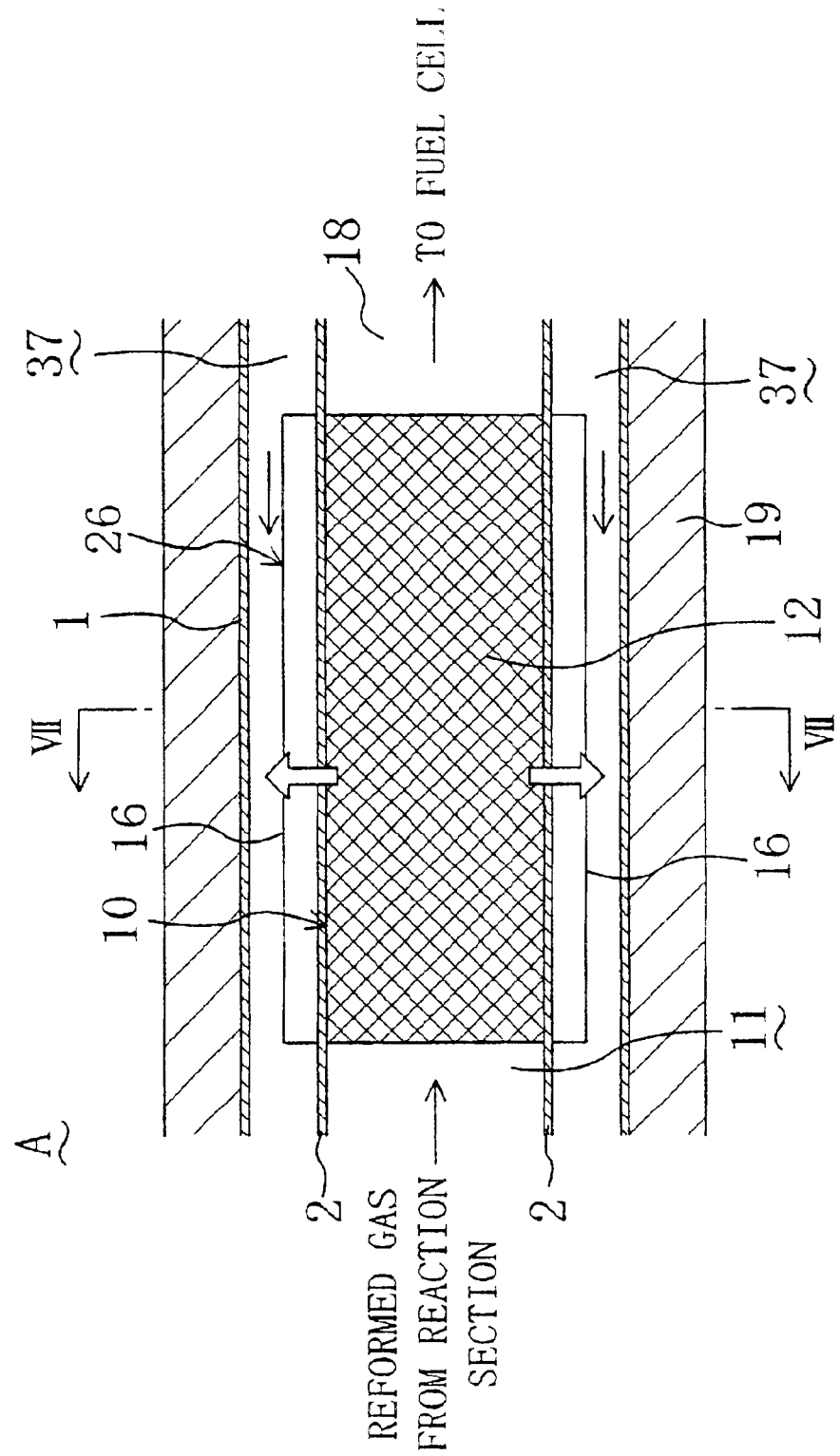
FIG. 6 is a cross-sectional view showing a shift conversion unit according to Embodiment 4.
Figure 7:
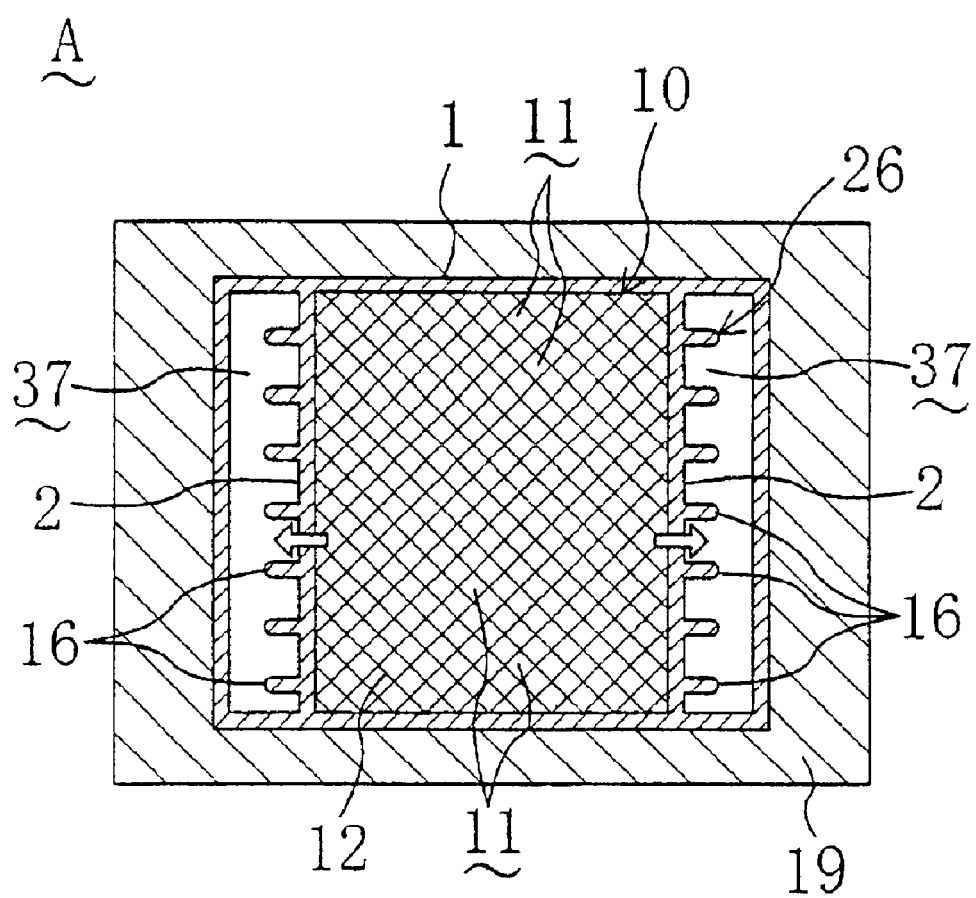
FIG. 7 is a cross-sectional view taken along the line VII—VII of FIG. 6.
Figure 8:
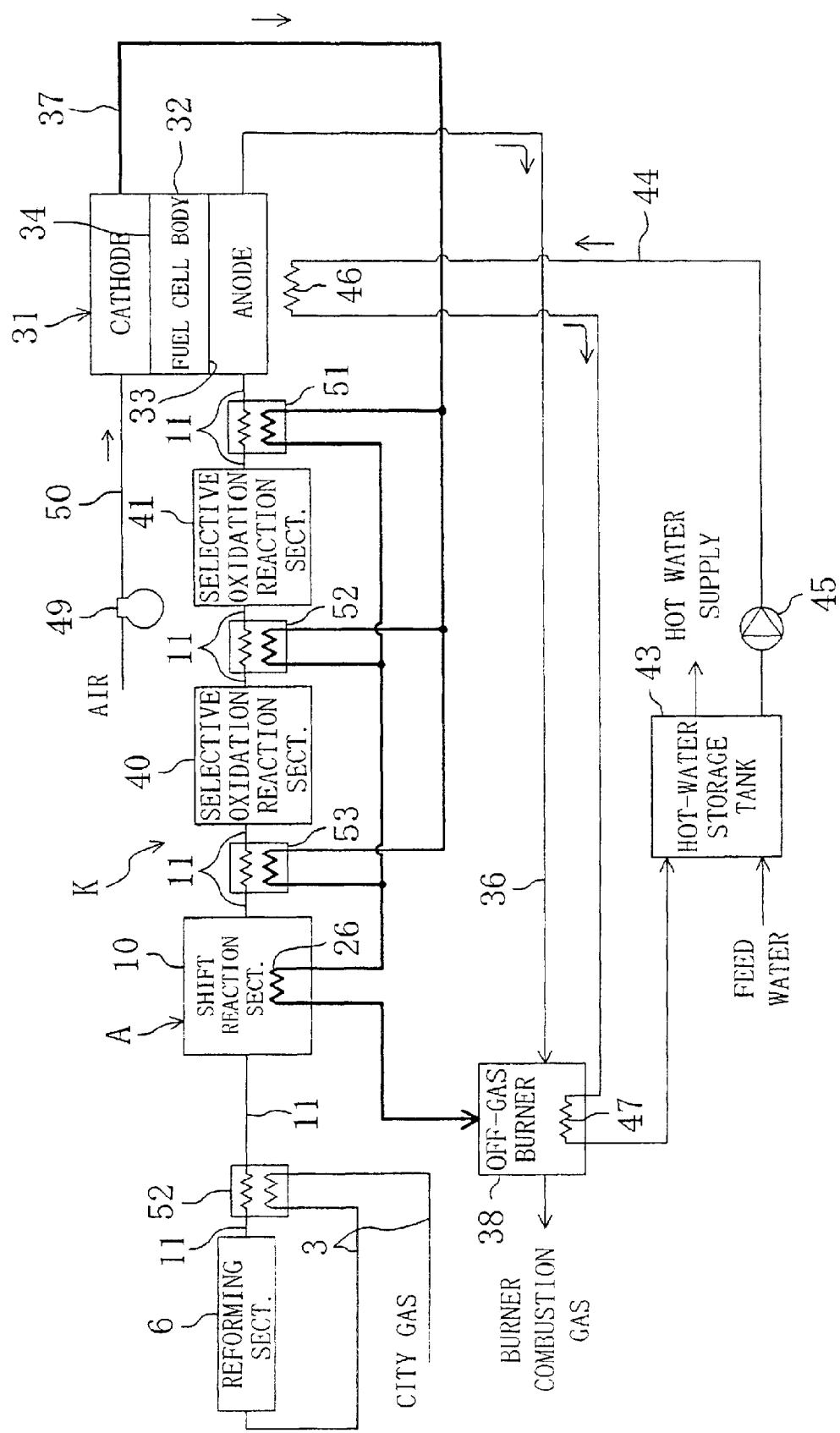
FIG. 8 is a circuit diagram showing a fuel cell system according to Embodiment 4.

FIGS. 6 to 8 show Embodiment 4 of the present invention. In each of the above embodiments, the reformed gas undergoes shift reaction while being heat-exchanged with the feed gas in the shift reaction section (10). In contrast, in this embodiment, the reformed gas undergoes shift reaction while being heat-exchanged with heat recovery gas.

Specifically, FIG. 8 illustrates a fuel cell system according to Embodiment 4, wherein (31) denotes a known polymer electrolyte fuel cell. This fuel cell (31) includes a hydrogen electrode (33) (fuel electrode) as an anode and an oxygen electrode (34) (air electrode) as a cathode which are catalyst electrodes disposed with an electrolytic cell body (32) of solid polymer interposed therebetween, and supply reformed gas containing hydrogen and air containing oxygen to the hydrogen electrode (33) and the oxygen electrode (34), respectively, to cause electrode reactions thereby generating an electromotive force between both the electrodes (33), (34).

The hydrogen electrode (33) and oxygen electrode (34) of the fuel cell (31) are connected to an off-gas burner (38) through a hydrogen electrode off-gas passage (36) and a heat recovery gas passage (37) as an oxygen electrode off-gas passage, respectively. In this system, hydrogen electrode side off-gas discharged from the hydrogen electrode (33) of the fuel cell (31) and oxygen electrode side off-gas discharge from the oxygen electrode (34) are individually supplied to the off-gas burner (38) for combustion.

In the figure, (K) denotes a reforming unit for reforming the feed gas containing the city gas and most air to produce hydrogen-rich reformed gas and supply it to the hydrogen electrode (33) of the fuel cell (31). The reforming unit (K) includes not only a reforming reaction section (6) and the shift reaction section (10) in a shift conversion unit (A) but also high- and low-temperature side CO-selective oxidation reaction sections (40), (41). The reforming reaction section (6) and the shift reaction section (10) are provided separately unlike each of Embodiment 1 to 3.

A feed gas preheater (52) is provided in a portion of a reformed gas passage (11) between the reforming reaction section (6) and the shift reaction section (10). The feed gas preheater (52) cools the reformed gas produced in the reforming reaction section (6) for the purpose of CO conversion in the shift reaction section (10) to recover its waste heat, and uses the recovered waste heat to preheat the feed gas in the feed gas passage (3) which should be supplied to the reforming reaction section (6).

Further, the CO-selective oxidation reaction sections (40), (41) are connected to the shift reaction section (10) through the reforming gas passage (11). Each of the CO-selective oxidation reaction sections (40), (41) causes the reformed gas converted in the shift reaction section (10) to react with selective partial oxidation catalyst in a hydrogen atmosphere to remove carbon monoxide contained in the reformed gas thereby further reducing its CO concentration. Furthermore, the low-temperature side CO-selective oxidation reaction selection (41) is connected to the hydrogen electrode (33) of the fuel cell (31) through the reformed gas passage (11).

The fuel cell system is accompanied with a cooling water supply system, and the cooling water supply system includes a hot-water storage tank (43) for storing hot water. A supply section of the hot-water storage tank (43) is connected to the upstream end of a cooling water passage (44), while a recovery section of the same hot-water storage tank (43) is connected to the downstream end of the cooling water passage (44). Further, the upstream end of the cooling water passage (44) is provided with a circulating pump (45). This circulating pump (45) circulates water between the hot-water storage tank (43) and the cooling water passage (44).

To the side of the cooling water passage (44) downstream from the circulating pump (45), a cell cooling section (46) formed of a heat exchanger for cooling the fuel cell (31) by the water discharged from the circulating pump (45) to recover its waste heat and a burner heat recovery section (47) formed of a heat exchanger for cooling combustion gas discharged from the off-gas burner (38) to recover its waste heat are connected in series in the order from the upstream side.

In the figure, (49) denotes a blower for blowing off air. The blower (49) is connected to the upstream end of an air supply passage (50), and the downstream end of the air supply passage (50) is connected to the oxygen electrode (34) of the fuel cell (31). Thus, air (oxygen) from the blower (49) is supplied to the oxygen electrode (34) of the fuel cell (31) through the air supply passage (50).

Partway in the heat recovery gas passage (37) between the oxygen electrode (34) of the fuel cell (31) and the off-gas burner (38), parallel-connected in branched manner are a heat exchanger (51) for cooling the reformed gas flowing from the low-temperature side CO-selective oxidation reaction section (41) toward the fuel cell (31) to recover its waste heat, a heat exchanger (52) for cooling the reformed gas flowing from the high-temperature side CO-selective oxidation reaction section (40) toward the low-temperature side CO-selective oxidation reaction section (41) to recover its waste heat, and a heat exchanger (53) for cooling the reformed gas produced in the shift reaction section (10) to recover its waste heat.

Further, the heat recovery gas passage (37) is series-connected at its portion downstream from the three heat exchangers (51) to (53) with a heat exchanger (26) that is provided in the shift reaction section (10) and cools the reformed gas from the reforming reaction section (6) to recover its waste heat. The shift reaction section (10) thus effects shift reaction of the reformed gas from the reforming reaction section (6) while heat-exchanging the reformed gas with the heat recovery gas in the heat exchanger (26).

As shown in enlarged manner in FIGS. 6 and 7, the housing (1) for the shift reaction section (10) of the shift conversion unit (A) has the shape of a rectangular tube, and the internal space of the housing (1) is divided into a single inner subspace and two outer subspaces by a pair of opposed partitions (2), (2). The inner subspace constitutes the reformed gas passage (11), and both the outer subspaces constitute the heat recovery gas passage (37). Therefore, the heat recovery gas passage (37) is provided partially around the below-described catalyst support (12) in the reformed gas passage (11).

In the inner subspace (reformed gas passage (11)) surrounded by the inner surfaces of the housing (1) and both the partitions (2), (2), the catalyst support (12) of porous material formed by foam metal, cordierite or ceramics is disposed so as to be presented to the reformed gas passage (11), and pieces of noble metal shift conversion catalyst of heat resistance for allowing shift reaction are applied to or supported on the catalyst support (12). More particularly, shift conversion catalyst is one in which Pt, Pt alloy or Ru alloy is used as active metal.

From the outer surface of each of the partitions (2), a plurality of heat transfer fins (16), (16), . . . are protruded so as to be presented to the heat recovery gas passage (37) and extend in the flow direction of the heat recovery gas in this passage. The heat transfer fins (16), (16), . . . and partitions (2), (2) constitute the heat exchanger (26) for allowing heat exchange between the reformed gas in the reformed gas passage (11) and the heat recovery gas in the heat recovery gas passage (37) (off-gas from the oxygen electrode (34) of the fuel cell (31)).

According to this embodiment, when the high-temperature reformed gas having exited from the reforming reaction section (6) is supplied to the reformed gas passage (11) of the shift reaction section (10), it undergoes shift reaction through the contact with the shift conversion catalyst applied to or supported on the catalyst support (12) during the time when it flows through the reformed gas passage (11). Then, the resultant heat of reaction is transferred to the heat recovery gas in the heat recovery gas passage (37) (off-gas from the oxygen electrode (34) of the fuel cell (31)) through the heat transfer fins (16), (16), . . . of the heat exchanger (26) and the partitions (2), (2).

In this manner, the high-temperature reformed gas from the reforming reaction section (6) undergoes shift conversion by the water gas shift reaction in the shift reaction section (10) while being heat-exchanged with the heat recovery gas as off-gas from the oxygen electrode (34) of the fuel cell (31). Accordingly, the reformed gas having exited from the reforming reaction section (6) will undergo shift conversion while keeping its high temperature, and therefore the reformed gas can undergo shift conversion over a wide temperature range from high temperature conditions where the reaction rate is high to low temperature conditions where the reaction rate is low but the gas reacts advantageously at equilibrium. Specifically, as the result of heat exchange between the high-temperature reformed gas from the reforming reaction section (6) and the heat recovery gas, the reformed gas entrance side of the shift reaction section (10) is elevated in temperature to increase the reaction rate while the reformed gas exit side thereof is lowered in temperature to reduce the reaction rate. This enables reduction in CO concentration at thermal equilibrium.

Further, the need to control the temperature of the reformed gas can be eliminated thereby simplifying the construction of the shift conversion unit (A).

Furthermore, the loading amount of the shift conversion catalyst into the shift reaction section (10) can be decreased and the thermal capacity can be reduced. As a result, the shift reaction section (10) can maintain excellent response to load variations and start-up characteristics.

Further, since the shift conversion catalyst of the shift reaction section (10) is noble metal catalyst with heat resistance like Embodiment 1, it can hold high activity over a wide temperature range.

Furthermore, since the shift conversion catalyst of the shift reaction section (10) is one in which Pt, Pt alloy or Ru alloy is used as active metal, it can be highly active at high temperatures and makes it difficult to cause methanation.

Further, since the shift conversion catalyst of the shift reaction section (10) is applied to or supported on a catalyst support (12) of porous material, this increases the contact area between the shift conversion catalyst and the reformed gas in the shift reaction section (10) thereby increasing the reaction rate and enhancing the efficiency of heat radiation.

Furthermore, since the porous material is of either foam metal, cordierite or ceramics, there can be easily obtained porous material that especially ensures to increase the contact area with the reformed gas.

Further, since the heat recovery gas passage (37) is provided partially around the catalyst support (12), the catalyst support (12) is surrounded by the heat recovery gas passage (37) thereby improving the thermal efficiency. It is to be noted that the heat recovery gas passage (37) may be provided to surround the entire periphery of the catalyst support (12) in the reformed gas passage (11).

Furthermore, since the heat recovery gas is off-gas from the oxygen electrode (34) of the fuel cell (31), the need to newly prepare air is eliminated unlike the case where air is used as heat recovery gas. Accordingly, the existing off-gas from the fuel cell (31) can be utilized as it is and there is no need for any blower and its driving power for allowing the air to flow as heat recovery gas.

It is to be noted that air can be used as heat recovery gas as described above. In this case, the use of air as heat recovery gas offers the advantage of enabling stable heat exchange even at partial loads in the case of recovery of high-temperature heat thereby easily obtaining serviceable heat recovery gas.

(Embodiment 5)

Figure 9:
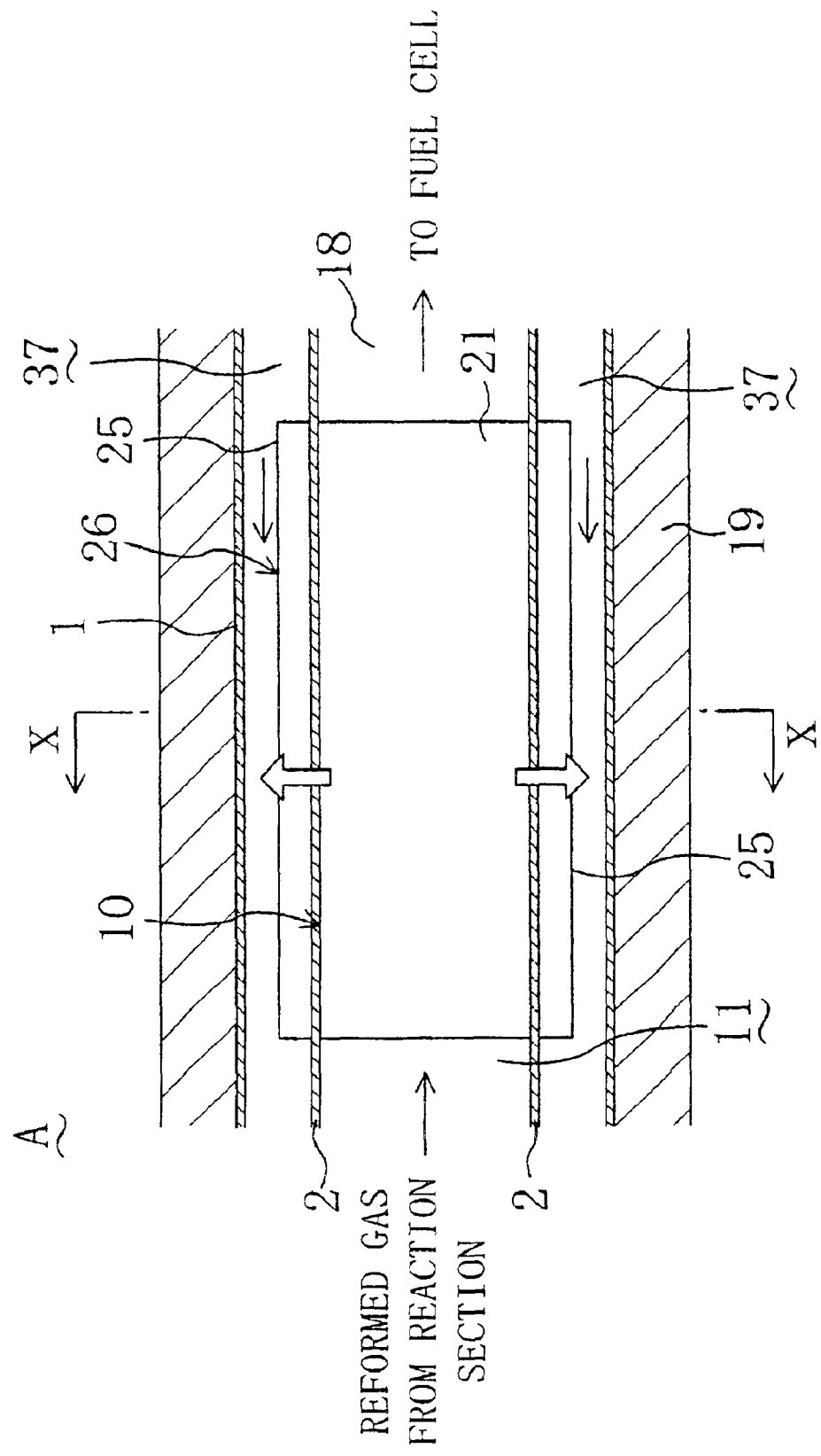
FIG. 9 is a corresponding view of FIG. 6 which shows Embodiment 5.
Figure 10:
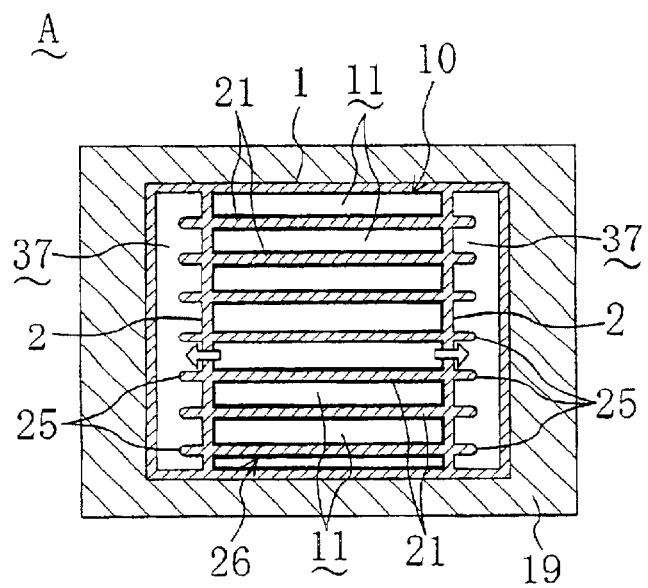
FIG. 10 is a cross-sectional view taken along the line X—X of FIG. 9.

FIGS. 9 and 10 show Embodiment 5, wherein the structure of the shift reaction section (10) in Embodiment 4 is changed.

Specifically, in this embodiment, like Embodiment 2, a plurality of reformed gas side heat transfer fins (21), (21), . . . are bridged integrally between the inner surfaces of both partitions (2), (2) in a housing (1) of a shift reaction section (10) of a shift conversion unit (A) so as to be presented to a reformed gas passage (11) (inner subspace) between both the partitions (2), (2) and to extend in the flow direction of the reformed gas in the passage. On the other hand, from the outer surface of each of the partitions (2), a plurality of heat recovery gas side heat transfer fins (25), (25), . . . are protruded to extend in the axial direction of the housing (1) so as to be presented to a heat recovery gas passage (37). The reformed gas side heat transfer fins (21), (21), . . . and the heat recovery gas side heat transfer fins (25), (25), . . . constitute a heat exchanger (26) for exchanging heat between the reformed gas in the reformed gas passage (11) and the heat recovery gas in the heat recovery gas passage (37).

Further, pieces of shift conversion catalyst forming the shift reaction section (10) are applied to or supported on the surface of each of the reformed gas side heat transfer fins (21) and the inner surface of each of the partitions (2) and the inner surface of the housing (1) which are presented to the reformed gas passage (11) (and which are each made from metal and constitute a catalyst support), (wherein positions of the pieces of shift conversion catalyst are indicated in heavy solid lines in FIG. 10). Other structures are the same as those of Embodiment 4.

In this embodiment, when the high-temperature reformed gas from a reforming reaction section (6) is supplied to the reformed gas passage (11) of the shift reaction section (10), it undergoes shift reaction through the contact with the shift conversion catalyst on the surfaces of each of the reformed gas side heat transfer fins (21), the inner surface of each of the partitions (2) and the inner surface of the housing (1) which are presented to the reformed gas passage (11), during the time when it flows through the reformed gas passage (11). Then, the resultant heat of reaction is transferred from the reformed gas side heat transfer fins (21), (21), . . .

through the heat recovery gas side heat transfer fins (25), (25), . . . to the heat recovery gas in the heat recovery gas passage (37). Therefore, also in this case, the same effects as obtained in Embodiment 4 can be provided.

Further, since the shift conversion catalyst is applied to or supported on the surface of each of the reformed gas side heat transfer fins (21) and the inner surface of each of the partitions (2) and the inner surface of the housing (1) which all constitute catalyst supports of metal, the efficiency of heat transfer from the reformed gas to the heat recovery gas in the shift reaction section (10) can be enhanced, thereby obtaining desirable catalyst supports for cooling the shift conversion catalyst presented to the reforming gas passage (11) through the heat exchange with the heat recovery gas. (Embodiment 6)

Figure 11:
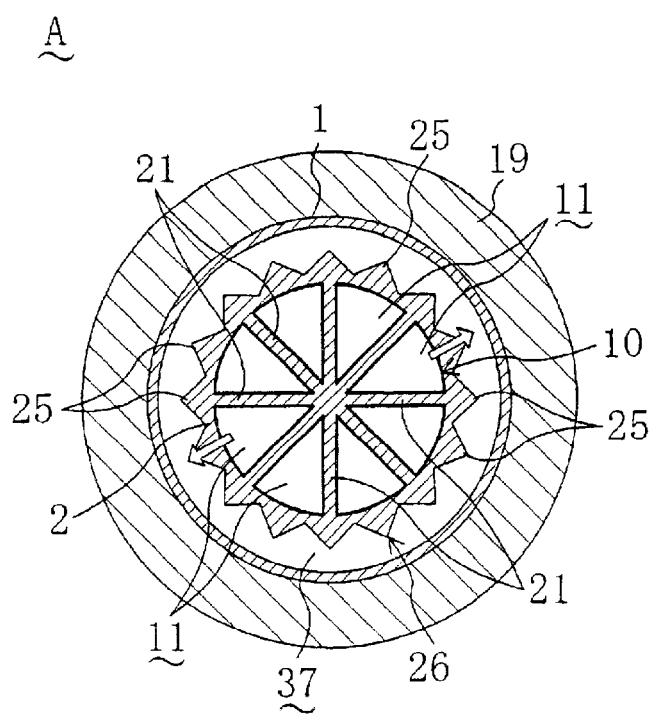
FIG. 11 is a corresponding view of FIG. 10 which shows Embodiment 6.

FIG. 11 shows Embodiment 6, wherein the shapes of the housing (1) and partitions (2) in the construction of Embodiment 5 are changed in circular form.

Specifically, in this embodiment, a housing (1) and a partition (2) are formed in cylindrical shape so as to be disposed concentrically, like Embodiment 3. Further, heat recovery side heat transfer fins (25), (25), . . . of a heat exchanger (26) are extended from the outer periphery of the partition (2), while reformed gas side heat transfer fins (21), (21), . . . are extended from the inner surface of the partition (2) to divide a reformed gas passage (11) into sections. Pieces of shift conversion catalyst are applied to or supported on the surface of each of the reformed gas side heat transfer fins (21) and the inner surface of the partition (2) (all of which are catalyst supports of metal). Accordingly, also in this embodiment, the same effects as obtained in Embodiment 5 can be exhibited.

It goes without saying that the present invention is applicable for reforming units used for any application other than the fuel cell systems as described in the above respective embodiments.

INDUSTRIAL APPLICABILITY

The present invention allows shift conversion of reformed gas having exited from the reforming reaction section over a wide temperature range from high temperature conditions where the reaction rate is high to low temperature conditions where the reaction rate is low but the gas reacts advantageously at equilibrium to extend the temperature range of shift conversion, eliminates the need for temperature control over the reformed gas to simplify the construction of the shift conversion unit, and provides a reduced loading amount of shift conversion catalyst in the shift reaction section. Accordingly, the present invention has a high industrial applicability in that fuel cells and hydrogen engines can be improved in practicability.

What is claimed is:

1. A shift conversion unit having a shift reaction section (10) for causing hydrogen-rich reformed gas produced by partial oxidation of feed gas that is composed of hydrocarbon gas, oxidizing gas and steam in a reforming reaction section (6) to undergo shift conversion by water gas shift reaction with shift conversion catalyst, comprising:

a heat exchanger (15) is provided for exchanging heat of reaction and sensible heat in the shift reaction section (10) with heat of the feed gas in the feed gas passage (3) by heat radiation;

wherein the shift reaction section (10) is arranged to introduce the reformed gas from the reforming reaction section (6) directly into a reformed gas passage (11) and effect the shift reaction while heat-exchanging the reformed gas with the feed gas, and the reformed gas passage (11) of the shift reaction section (10) is formed so that the reformed gas flows from the center side toward the outer peripheral side of the shift reaction section (10).

2. The shift conversion unit of claim 1, characterized in that the shift conversion catalyst of the shift reaction section (10) is noble metal catalyst with heat resistance.

3. The shift conversion unit of claim 2, characterized in that the shift conversion catalyst of the shift reaction section (10) is catalyst in which Pt, Pt alloy or Ru alloy is used as active metal.

4. The shift conversion unit of claim 1, wherein a distance between the shift reaction section (10) and the feed gas passage (3) at a downstream end of the shift reaction section (10), in relation to a flow direction of the reformed gas in the feed gas passage (3), is larger than a distance between the shift reaction section (10) and the feed gas passage (3) and an upstream end of the shift reaction section (10).

5. The shift conversion unit of claim 1, wherein the heat exchanger (15) includes a heat transfer fin (16) presented to the feed gas passage (3).

6. The shift conversion unit of claim 5, wherein a plurality of said heat transfer fins (16) are provided along the feed gas passage (3), and a pitch of some of the heat transfer fins (16) located upstream in a direction of flow of the reformed gas in the shift reaction section (10) is smaller than that of some of the heat transfer fins (16) located downstream in the direction of flow of the reformed gas.

7. A shift conversion unit having a shift reaction section (10) for causing hydrogen-rich reformed gas produced by partial oxidation of feed gas that is composed of hydrocarbon gas, oxidizing gas and steam in a reforming reaction section (6) to undergo shift conversion by water gas shift reaction with a shift conversion catalyst, comprising:

a heat exchanger (23) including a reformed gas side heat transfer fin (21) presented to the reformed gas passage (11) and a feed gas side heat transfer fin (22) presented to the feed gas passage (3) and exchanges heat of reaction and sensible heat in the shift reaction section (10) with heat of the feed gas in the feed gas passage (3), wherein the shift reaction section (10) is arranged to introduce the reformed gas from the reforming reaction section (6) directly into a reformed gas passage (11) and effect the shift reaction while heat-exchanging the reformed gas with the feed gas, and the shift conversion catalyst of the shift reaction section (10) is applied to or supported on at least the reformed gas side heat transfer fin (21).

* * * * *

UNITED STATES PATENT AND TRADEMARK OFFICE
CERTIFICATE OF CORRECTION

PATENT NO.    : 6,814,944 B1
DATED         : November 9, 2004
INVENTOR(S)   : Nobuki Matsui et al.

It is certified that error appears in the above-identified patent and that said Letters Patent is hereby corrected as shown below:

Title page,
Item [54], Title, "MODIFYING DEVICE", should read -- SHIFT CONVERSION UNIT --

Item [56], References Cited, FOREIGN PATENT DOCUMENTS, insert -- JP 11-67256 --

Signed and Sealed this

Third Day of May, 2005

JON W. DUDAS
*Director of the United States Patent and Trademark Office*